Jan. 19, 1960 T. BODDE 2,921,758
HELICOPTER WITH JET-DRIVEN ROTOR

Filed June 29, 1956 3 Sheets-Sheet 2

INVENTOR.
THEODORE BODDE

BY

ATTORNEYS.

Jan. 19, 1960 T. BODDE 2,921,758
HELICOPTER WITH JET-DRIVEN ROTOR
Filed June 29, 1956 3 Sheets-Sheet 3

INVENTOR.
THEODORE BODDE

BY
ATTORNEYS.

United States Patent Office 2,921,758
Patented Jan. 19, 1960

2,921,758

HELICOPTER WITH JET-DRIVEN ROTOR

Theodore Bodde, Mount Airy, Pa.

Application June 29, 1956, Serial No. 594,782

11 Claims. (Cl. 244—17.11)

The present invention relates to high lift helicopters and jet engines suitable therefor.

A purpose of the invention is to obtain greater lifting power or pulling power from a jet engine.

A further purpose is to provide a jet rotor, with means for rotatably mounting the jet rotor on an axis, a jet engine on the jet rotor including means for discharging water through the jet engine, a trough rotor, means for rotatably mounting the trough rotor on the axis and a trough on the trough rotor surrounding the jet engine and responding to the kinetic energy of the jet.

A further purpose is to provide helicopter blades on the jet rotor and also to provide helicopter blades on the trough rotor, desirably placing the two sets of helicopter blades adjacent one another.

A further purpose is to mount a scoop to move through the trough and recover water from the trough, the scoop desirably being mounted on the jet rotor and desirably being directed oppositely to the jet, suitably with a venturi at its inlet.

A further purpose is to pump water from a source of water through a hose to the jet engine for the operation of the engine and of the helicopter.

A further purpose to to move the trough by the kinetic energy in the water.

A further purpose is to use the increased lift of the helicopter for lifting and for supporting and maintaining heavy loads.

Further purposes appear in the specification and in the claims.

In the drawings I have chosen to illustrate a few only of the numerous embodiments in which my invention may appear, selecting the forms shown from the standpoints of convenience in illustration, satisfactory operation and clear demonstration of the principles involved.

Figure 3 is an enlarged diagrammatic fragmentary radial section of a jet engine which may be used in the invention, the section being taken on the line 3—3 of Figure 2.

Figure 1:
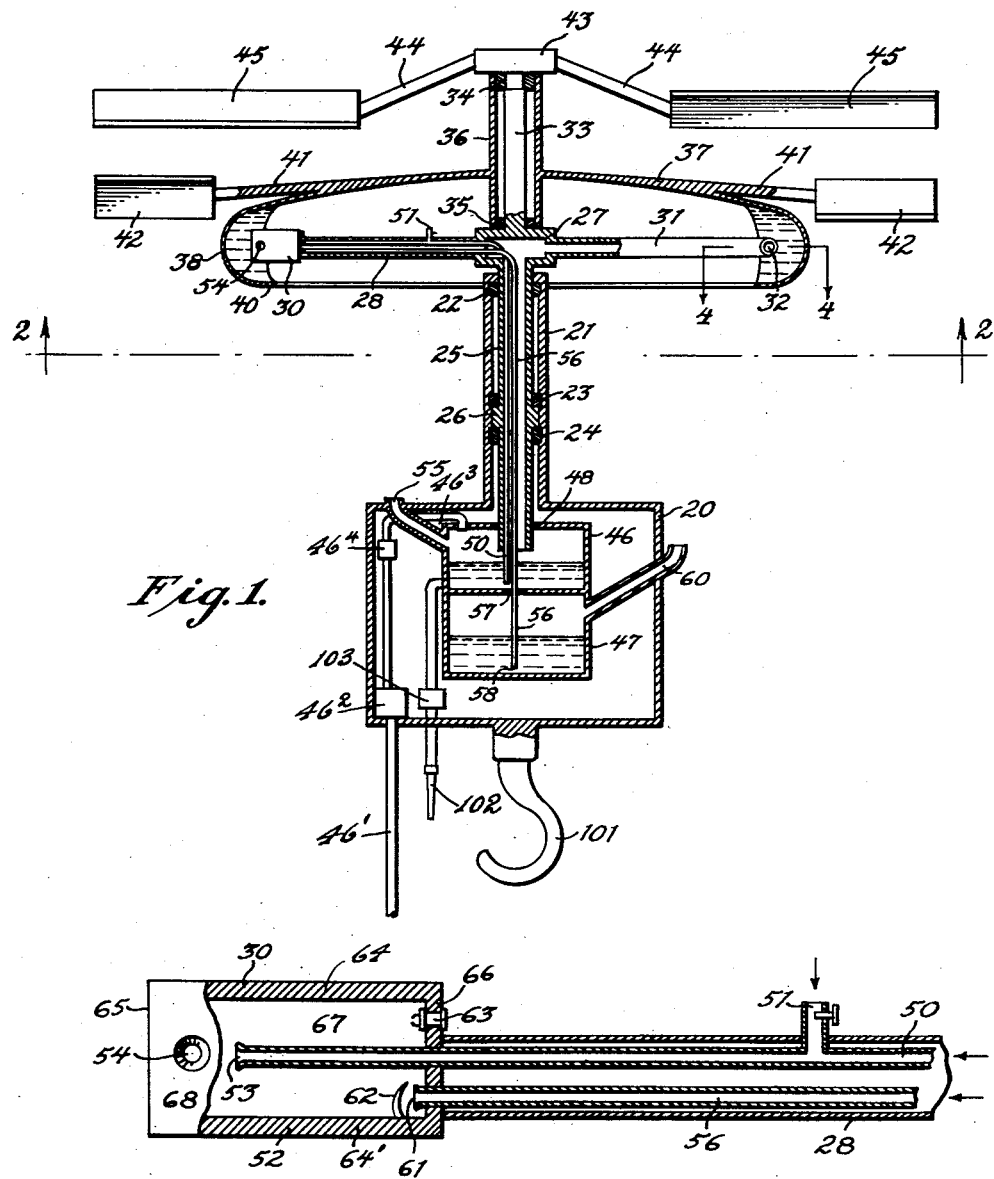
Figure 1 is a vertical axial diagrammatic section of a helicopter according to the invention.
Figure 2:
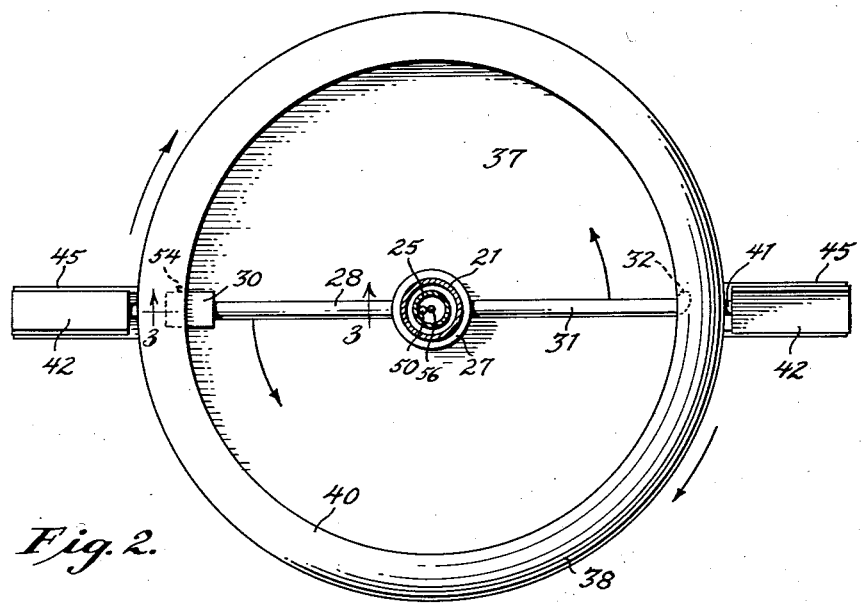
Figure 2 is a bottom plan section of the helicopter of Figure 1, taken on the line 2—2 of Figure 1.
Figure 4:
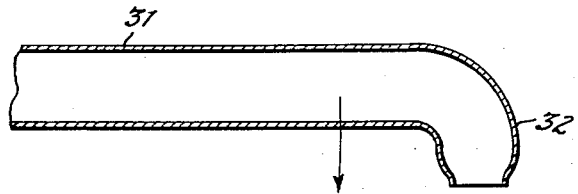
Figure 4 is an enlarged section of Figure 1 on the line 4—4.

Describing in illustration but not in limitation and referring to the drawings:

The invention is designed to produce increased lift or thrust in a helicopter or other jet engine, preferably applied to a helicopter.

In accordance with the invention, a jet rotor mounts a jet engine to rotate about an axis. The jet engine, besides maintaining a combustion jet, discharges water. A trough is provided surrounding the jet engine and mounted on a trough rotor. The trough responds to the kinetic energy of the jet. In the preferred embodiment helicopter blades are provided on the jet rotor and also on the trough rotor, preferably closely adjacent one another.

In the preferred embodiment a scoop operates in the trough and collects the excess of water. The scoop is preferably mounted on the jet rotor and moves oppositely to the jet, suitably carrying a venturi at its inlet.

The helicopter may draw on an outside source of water, desirably pumped through a hose to the engine.

The increased lift can be used in a wide variety of ways. For example, the helicopter may be used as a crane to lift trees, to raise vehicles out of the mud or to lift buildings. The helicopter may be employed to advantage in connection with fire fighting, for example by lifting off the roof of a building in order to fight a fire, or by supporting a hose which either discharges water from a tank carried by the helicopter or is connected to a source of water on the ground. In the latter case, the water may be pumped by a fire engine on the ground or by a pump on the helicopter.

Considering first the form as shown in Figures 1 to 4, inclusive, the helicopter has a fuselage 20 mounting a bearing housing 21 which carries a journal bearing 22 and thrust bearings 23 and 24. The journal bearing journals a tubular rotor shaft 25 and the thrust bearing journals a thrust ring 26 on the rotor shaft 25.

The rotor shaft 25 extends vertically and mounts a rotor hub 27 from which extends a radial jet engine supporting arm 28 mounting a jet engine 30 at the outer end.

The hub 27 also mounts a tubular scoop supporting arm 31 which mounts a scoop 32 at the outer end.

The tubular shaft 25 at its upper end has a shaft extension 33 which carries bearings 34 and 35 which rotatably mount a scoop rotor hub 36 which carries a trough supporting shell 37 extending transversely to the axis. The trough supporting shell 37 at its outer end carries a rim-like trough 38 which is surrounding and adjacent to the jet engine and the scoop and which has a turned in edge 40 adapted to hold water in the trough. The trough supporting shell also has radially extending blade arms 41 mounting helicopter blades 42. The detail of the mounting, manipulation and control of the blades as in conventional helicopter practice is unimportant from the standpoint of the present invention and is omitted to simplify the disclosure.

At the upper end of the shaft extension 33 a rotor hub 43 is carried by the shaft and the hub mounts radially extending blade arms 44 which carries helicopter blades 45 which are slightly above but adjacent to the blades 42. Again the detail of the blade mounting, manipulation and control is well-known and is omitted.

Beneath the rotors and suitably placed in the fuselage there is a water tank 46 and a fuel tank 47, both desirably stationary with respect to the fuselage. The lower part of the tubular shaft 25 enters the water tank 46 at a stuffing box 48. The jet engine has a water line 50 which extends from a position near the bottom of the water tank up through the hollow shaft 25 and enters the jet engine supporting arm 28. The water line at a point radially outward from the axis has an adjustable air inlet 51 through which air is entrained and the combined water and air line passes into combustion chamber 52 of the jet engine and terminates near the radial outer end of the combustion chamber at 53 adjacent to jet opening 54 which is located in the trailing direction of the rotor. An air inlet to the water tank 46 is provided at 55.

The fuel line 56 extends through the center of the tubular shaft 25 and extends through an opening in the bottom of the water tank packed by stuffing box 57 terminating at 58 near the bottom of fuel tank 47. An air inlet to the fuel tank is provided at 60. The fuel line 56 extends out through jet engine supporting arm 28 and terminates at 61 near the radially inner end of the combustion chamber and in line with fuel atomizing baffle 62 which is beyond the discharge end of the fuel line.

A suitable spark plug is provided in the combustion chamber at 63.

The scoop 32 is directed oppositely from the direction of the jet so that the scoop is moving forward and picking up water as it turns under the reaction of the jet.

In operation of the device, deferring for a moment the description of the jet engine, it will be evident that the jet projects combustion gases and water which enter the trough and the water by impingement on the trough causes the trough to rotate opposite to the rotation of the jet rotor. Thus the trough rotor blades are moving oppositely to the jet rotor blades. The lift is promoted by the effect of the water. As the jet rotor operates, water accumulates in the trough and it is picked up by the scoop and returned through the hollow interior of tubular shaft 25 to the water tank.

The lift can be increased by obtaining an additional source of water, which is suitably secured when operating over a river, lake or ocean by pumping water through a hose 46' by a suitable pump 46$^2$ driven by the helicopter engine and discharging it through pipe 46$^3$ and valve 46$^4$ into the water tank.

Fuel and water may be pumped to the engine by the centrifugal pumping action of the radial arms, although if desired supplemental pumps of any desired character can be operated to pump water and fuel.

Any suitable jet engine may be used, the embodiments here shown being merely desirable forms. The jet engine should in any case be designed to expel water as well as combustion gases. In the form shown, the water solves the problem of pumping air to the jet engine. The water entrains air through an aspirator or the like so that the water carries bubbles of air to the jet. In the combustion chamber of the jet, a separation takes place due to the greater mass of the water per unit volume, the water being thrown to the radial outer end of the combustion chamber and the air thus being dried and prepared for combustion. The fuel is atomized in the combustion chamber by striking the baffle 62 and mixes intimately with the air. As expulsions occur, water is expelled through the jet which is located near the radial outer end of the combustion chamber where the water collects. Obstructions of the jet by the water increases the reaction.

The discharge through the jet is preferably further impeded by a valve which requires building up a predetermined pressure in the combustion chamber before discharge. In the preferred form, ignition occurs by an ignition device which is triggered when a predetermined pressure is built up, although the ignition device may simply be operated on a time cycle if desired. The valve preferably provides leakage even when it is closed in order to more effectively clear combustion gases and avoid the possibility that the combustion chamber could wholly fill with water.

In the form shown in the drawings, while only one jet engine is shown, it will be evident that a number of jets can be provided as required.

The combustion chamber is conveniently rectangular having a top 64, a bottom 64', an outer wall 65, an inner wall 66, a forward wall 67 and a rearward wall 68. The fuel used may be gasoline, kerosene or the like.

The water enters the combustion chamber radially beyond the fuel atomizing baffle 62 along with its entrained air. It is desirable to use a check valve 70 in the water inlet pipes 50 beyond the joining together of the two pipes (where two pipes are used as in Figure 5).

The fuel in the combustion chamber is ignited by an ignition device, suitably a spark plug 63, although alternatively an exposed incandescent filament such as a platinum filament may be used. While the spark plug may operate continuously, or substantially continuously on a time cycle, the spark plug is preferably pressure actuated as shown. The sparking transformer 71 has a core 72, a primary 73, a secondary 74 and a vibrator 75 having a vibrator contact 76. Leads 77 connect the secondary of the sparking transformer to the spark plug. A pressure switch closes the circuit consisting of a source suitably a battery or generator 78 in series with the primary 73, the movable contact 80 of the pressure switch, the fixed contact 81 of the pressure switch and the vibrator switch 76. The pressure switch 82 consists of a bracket 83 having an arm 84 which supports the fixed contact 81 and limits the movable contact consisting essentially of a plunger and having at its end a piston 85 extending through an opening 86 into the wall of the combustion chamber and having a flange 87 which normally closes the outside of the opening. A spiral compression spring 88 around the plunger-like movable contact acts between the bracket 90 and the flange 87 to urge the pressure switch into its normal open position.

Figure 5:
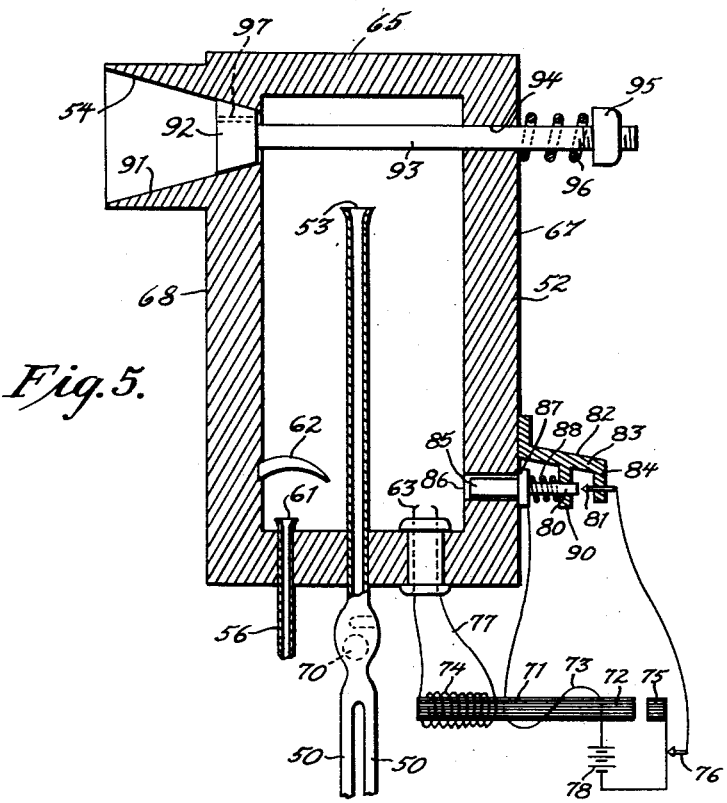
Figure 5 is an enlarged section transverse to the axis showing a modified form of jet engine which may be employed.

In the form of Figure 5, the jet opening 54 has nozzle walls 91 tapering outwardly which preferably conform to the requirements to substantially fully expand the gas expelled and lower its temperature as far as possible toward room temperature, to utilize as much as possible of the heat in reaction energy. In the preferred embodiment the orifice is not fully continuously open but is closed by a valve 92 suitably of cone formation fitting in the jet opening and having a stem 93 which passes through an opening 94 in the forward wall of the combustion chamber and carries an adjustment nut 95 which compresses a spiral compression spring 96 acting between the nut and the forward wall to urge the valve toward closure. The valve is optional.

Figure 6:
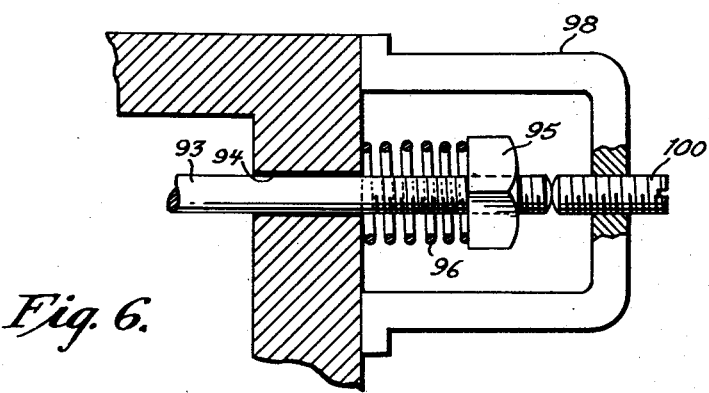
Figure 6 is a modified fragment of Figure 5.

It is preferable to provide for leakage from the combustion chamber. This leakage should be small and desirably adjustable. A leakage port 97 is shown through the valve in Figure 5, suitably being a drill hole. In Figure 6 the outer end of the valve stem 93 is surrounded by housing 98 which carries an adjustment screw 100 axially in line with the valve stem and impinging on the outer end of the valve stem when the valve closes to act as a stop. The adjustment screw is set at a position which prevents full closing of the valve, the valve being desirably open just "a crack."

The jet engine as shown is normally not self-starting but can be started by an electric self starter or other suitable means. With water and air passing to the jet combustion chamber through the water tube and fuel passing through the fuel tube, the fuel is atomized and the water is separated from the air by centrifugal force. The dry air mixes with the atomized fuel and is ignited by the sparking device. If the sparking is pressure actuated it actuates when sufficient pressure is built up to cause the pressure switch to function.

If the jet has a nozzle formation which expands the gases and cools them, the jet converts a large part of its heat into reaction energy.

With the valve located in the jet opening, the pressure of the exploding gases must build up high enough to open the valve and the valve by obstructing the free flow increases the reaction force. The valve increases the pressure build-up and acts as a safety or relief valve. The effect of the leakage port provided at 97 through the valve or the incomplete closing of the valve is to permit more effective clearing of exploded gases after the valve closes (as far as possible). Exit from the combustion chamber will substantially stop as soon as the water inside the combustion chamber reaches the leakage port since the frictional drag of the walls of the very small port on the water will prevent large quantities of water from discharging. This slight expulsion of water is, however, desirable to restore operation of the device if through some accident the combustion chamber should become filled with water.

If desired, any other suitable form of jet engine may be used, discharging the water stream through the jet engine as well as discharging combustion gases.

Any suitable attachment for lifting is provided, one desirable form being the crane hook 101 at the bottom of the fuselage. It will of course be understood that suitable crane hoists will be used as required. A fire hose is shown at 102 connected to tank 46 through valve 103 for use in fighting fires.

In view of my invention and disclosure, variations and modifications to meet individual whim or particular need will doubtless become evident to others skilled in the art, to obtain all or part of the benefits of my invention without copying the mechanism shown, and I, therefore, claim all such insofar as they fall within the reasonable spirit and scope of my claims.

Having thus described my invention, what I claim as new and desire to secure by Letters Patent is:

1. In a helicopter, a helicopter body, a jet rotor mounted on the helicopter body to rotate about a generally vertical axis, a jet engine mounted on the jet rotor, discharging through a jet in a direction to rotate the jet rotor around the axis by the reaction of the jet and including means discharging water through the jet of the jet engine, a trough rotor mounted on the body and rotatable about the same axis as the jet rotor, a trough mounted on the trough rotor, and having a rim portion extending circumferentially around the jet of the jet engine in position adjacent to the path of the jet, the trough and the trough rotor being driven at least in part by the jet, and blades mounted on one of the aforesaid rotors.

2. The helicopter of claim 1, having blades mounted on both of the aforesaid rotors.

3. The helicopter of claim 2, in which the blades on the jet rotor and those on the trough rotor are adjacent to one another.

4. The helicopter of claim 1, in combination with scoop means mounted on the jet rotor and moving through the trough to recover water which has been discharged by the jet.

5. The helicopter of claim 4, in which the scoop means has an opening for receipt of water, which opening is directed in a direction opposite to that of the jet.

6. The helicopter of claim 5, in which the scoop means has an inlet having a venturi therein.

7. The helicopter of claim 1, in combination with a hose, and means for pumping water from a source of water on the ground through the hose to the jet engine.

8. In an energy producing device involving a jet, a body, a jet rotor rotatably mounted on the body to turn about an axis, a jet engine mounted on the jet rotor at a position remote from the axis and including a jet adapted to turn the rotor by reaction, and means on the jet engine for discharging water through the jet, a trough rotor mounted on the body to rotate about the same axis, a trough mounted on the trough rotor and extending to a position surrounding the jet and adjacent to the jet, the trough and trough rotor being free to rotate together, and the trough rotor being driven by energy from the fluid expelled by the jet.

9. The device of claim 8, in combination with means including a scoop mounted on the jet rotor and moving through the trough to recover water from the trough which has been expelled by the jet.

10. The device of claim 9, in which the means including a scoop has an opening to receive water, which opening is directed in a direction opposite to the direction of the jet.

11. The device of claim 9, in which the means including a scoop has an inlet provided with a venturi.

References Cited in the file of this patent

UNITED STATES PATENTS

| | | |
|---|---|---|
| 1,604,290 | King | Oct. 26, 1926 |
| 1,853,869 | Marks | Apr. 12, 1932 |
| 2,425,904 | Vernon | Aug. 19, 1947 |
| 2,509,359 | Margolis | May 30, 1950 |
| 2,659,556 | Doblhoff | Nov. 17, 1953 |
| 2,690,809 | Kerry | Oct. 5, 1954 |

FOREIGN PATENTS

| | | |
|---|---|---|
| 795,517 | France | Jan. 8, 1936 |